United States Patent
Fujii et al.

(10) Patent No.: US 7,633,204 B2
(45) Date of Patent: Dec. 15, 2009

(54) MOTOR STATOR, SPINDLE MOTOR INCLUDING THE MOTOR STATOR, AND DISK DRIVE INCLUDING THE SPINDLE MOTOR

(75) Inventors: Hiromasa Fujii, Kyoto (JP); Wataru Yamauchi, Kyoto (JP)

(73) Assignee: Nidec Corporation, Kyoto (JP)

( * ) Notice: Subject to any disclaimer, the term of this patent is extended or adjusted under 35 U.S.C. 154(b) by 276 days.

(21) Appl. No.: 11/845,943

(22) Filed: Aug. 28, 2007

(65) Prior Publication Data

US 2008/0055764 A1   Mar. 6, 2008

(30) Foreign Application Priority Data

Aug. 30, 2006   (JP)   ............... 2006-233377

(51) Int. Cl.
   *H02K 1/00*   (2006.01)
(52) U.S. Cl. ............ 310/184; 310/179; 310/198
(58) Field of Classification Search ......... 310/179–180, 310/184, 198, 261.01, 254
   See application file for complete search history.

(56) References Cited

U.S. PATENT DOCUMENTS

| | | | | |
|---|---|---|---|---|
| 5,323,094 A | * | 6/1994 | Kaneda et al. | 318/400.32 |
| 5,723,931 A | * | 3/1998 | Andrey | 310/179 |
| 6,563,247 B2 | * | 5/2003 | Nguyen | 310/180 |
| 6,674,207 B2 | * | 1/2004 | Blasco Remacha | 310/184 |
| 6,888,280 B2 | * | 5/2005 | Dube et al. | 310/177 |
| 7,135,799 B2 | * | 11/2006 | Rittmeyer | 310/180 |
| 7,560,835 B2 | * | 7/2009 | Groening et al. | 310/166 |
| 2006/0214529 A1 | | 9/2006 | Nishino et al. | |

FOREIGN PATENT DOCUMENTS

| | | |
|---|---|---|
| JP | 06-343236 | 12/1994 |
| JP | 11-164580 | 6/1999 |
| JP | 2001-078485 | 3/2001 |
| JP | 2002-186203 | 6/2002 |
| JP | 3333442 | 7/2002 |
| JP | 3574998 | 7/2004 |
| JP | 2006-280044 | 10/2006 |

* cited by examiner

*Primary Examiner*—Thanh Lam
(74) *Attorney, Agent, or Firm*—Keating & Bennett, LLP

(57) ABSTRACT

A motor stator includes a stator core stack having a core back and a plurality of teeth extending from the core back in a radial direction of the core back. The motor stator also includes winding wires wound around the teeth and having no bonding layer. Only winding wires of the first and third phases are wound to prevent loosening thereof.

13 Claims, 17 Drawing Sheets

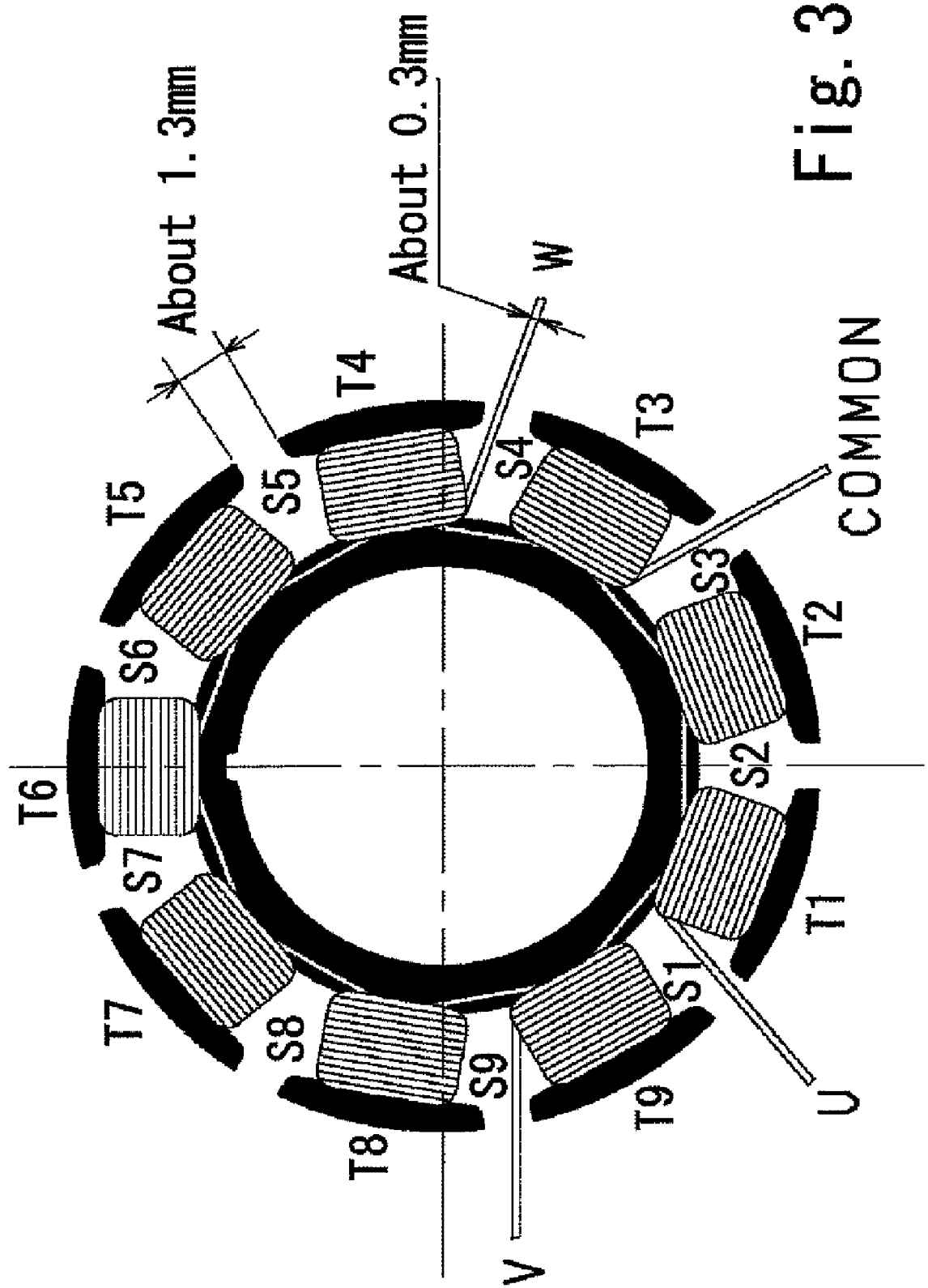

MOTOR STATOR, SPINDLE MOTOR INCLUDING THE MOTOR STATOR, AND DISK DRIVE INCLUDING THE SPINDLE MOTOR

BACKGROUND OF THE INVENTION

1. Field of the Invention

The present invention relates to a motor stator, a spindle motor including the motor stator, and a disk drive including the spindle motor.

2. Description of the Related Art

Disk drives such as hard disk drives use brushless motors (hereinafter, simply referred to as motors). Recently motor control methods are changing from linear control conventionally used to PWM (pulse width modulation) control which can effectively reduce power consumption. In PWM control, a pulsed current is input to a motor so as to cause generation of a counter-electromotive force by the motor inductance. The counter-electromotive force is used for driving the motor, thereby reducing a power required for driving the motor. Therefore, it is very important to minimize variations in the motor inductance.

When the pulse width of the pulsed current input to the motor is controlled in accordance with the rotation speed of the motor, highly efficient control can be achieved. In linear control, the rotation speed of the motor is obtained based on the counter-electromotive force. When the rotation speed is low, however, the counter-electromotive force is small and it is therefore difficult to obtain the rotation speed. For this reason, linear control cannot provide good controllability. On the other hand, in PWM control, a detected inductance value is used for improving rotation control performance in the low rotation speed range. Thus, it is important to make the inductances substantially even in PWM control.

In recent years, areal density of hard disk drives has rapidly increased. In the high-density hard disk drives, even a small amount of contamination causes failure. Therefore, it is strongly demanded to keep the inside of the hard disk drive clean in order to avoid contamination.

In motor stators, two-layer self-bonding magnetic wires have been used for forming coil windings. The two-layer self-bonding magnetic wire includes a magnetic wire coated with insulating material, e.g., polyurethane, polyester, and a bonding layer of thermoplastic resin or thermosetting resin, e.g., polyamide resin, butyral resin, epoxy resin. The two-layer self-bonding magnetic wire is usually heated after being wound around teeth of the motor stator, in order to prevent loosening of the two-layer self-bonding magnetic wire.

However, heating of the two-layer self-bonding magnetic wire causes generation of gas. The thus generated gas stays within the motor stator and leaks to the inside of a hard disk drive after the motor stator is mounted in the hard disk drive. Therefore, in order to keep the inside of the hard disk drive clean, change of the self bonding magnetic wire to non-self-bonding wire which does not have a bonding layer.

However, the non-self-bonding wire can be loosened easily and therefore requires an additional winding sequence in order to prevent the loosening. This makes mutual inductances between phases in a motor stator different. Especially in high-speed motors, it is necessary to use a conductive wire having a larger diameter and reduce the number of turns of winding of the conductive wire in order to make counter-electromotive force smaller. Therefore, effects of one or two turns for preventing the loosening become larger.

In order to prevent the loosening of the non-self-bonding wire, there is a technique of attaching a ring made of synthetic resin to the motor stator and catching the non-self-bonding wire with a projection of the ring. However, this technique increases the number of components which increases the cost. The increase in the number of components also makes the motor stator larger, resulting in the size increase of the hard disk drive. Thus, the use of the ring of synthetic resin is not preferable.

SUMMARY OF THE INVENTION

According to preferred embodiments of the present invention, a motor stator, a spindle motor including the motor stator, and a disk drive including the spindle motor are provided. In the motor stator, only the first phase winding wire and the third phase winding wire both of which do not include a bonding layer are wound to prevent loosening thereof.

Thus, loosening of the winding wire each phase can be prevented in a reliable manner even if the winding wire includes no bonding layer and variations in mutual inductances between phases can be reduced. Therefore, it is possible to obtain the rotation direction and the rotational speed of the spindle motor with high precision, and is also possible to control the spindle motor by PWM control with high efficiency.

Other features, elements, advantages and characteristics of the present invention will become more apparent from the following detailed description of preferred embodiments thereof with reference to the attached drawings.

BRIEF DESCRIPTION OF THE DRAWINGS

FIG. 3 shows a motor stator of the spindle motor of FIG. 1.

DETAILED DESCRIPTION OF PREFERRED EMBODIMENTS

Figure 1:
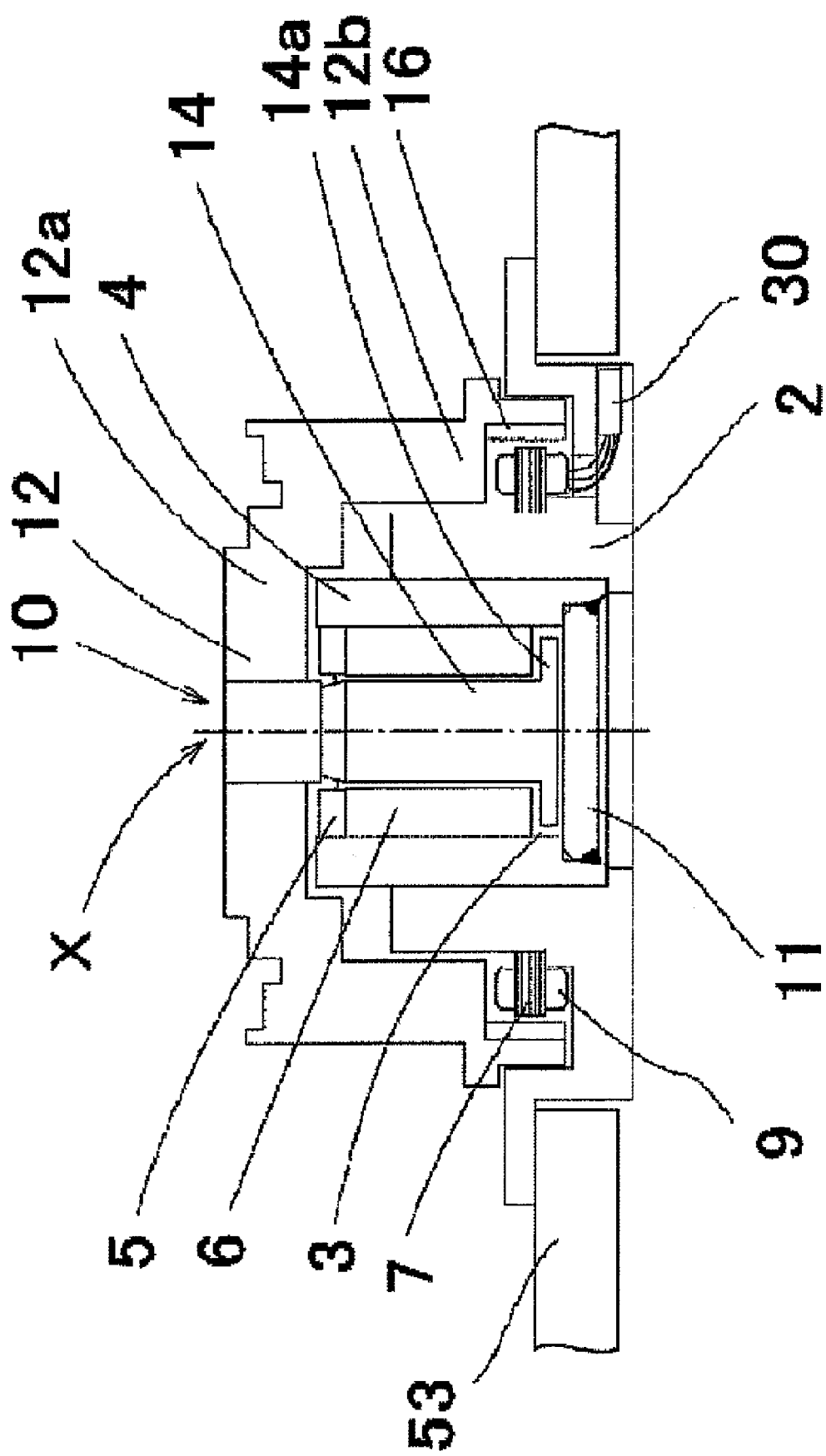
FIG. 1 is a vertical cross-sectional view of a spindle motor according to a first preferred embodiment of the present invention.

Referring to FIGS. 1 through 14, preferred embodiments of the present invention will be described in detail. It should be noted that in the explanation of the present invention, when positional relationships among and orientations of the different components are described as being up/down or left/right, ultimately positional relationships and orientations that are in the drawings are indicated; positional relationships among and orientations of the components once having been assembled into an actual device are not indicated. Meanwhile, in the following description, an axial direction indicates a direction parallel to a rotation axis, and a radial direction indicates a direction perpendicular to the rotation axis. In addition, N is an integer larger than 2 and n is a positive integer smaller than 4 in the following description.

First Preferred Embodiment

FIG. 1 is a vertical cross-sectional view of a spindle motor 1 used in a disk drive. In this preferred embodiment, the disk drive is a hard disk drive. The spindle motor 1 includes a base 53, a bracket 2 fixed to the base 53, a housing 4 fixed to the bracket 2, a sleeve 6 fixed to the inside of the housing 4, and a rotor 10 supported by the sleeve 6 in a rotatable manner around a rotation axis X.

The bracket 2 includes a through hole formed at its center and centered on the rotation axis X. The housing 4 is inserted into the through hole. In this preferred embodiment, the housing 4 is an axially extending member which is hollow and substantially cylindrical. One axial end of the housing 4 is closed with a plate 11. In this preferred embodiment, a lower end of the housing 4 is closed with the plate 11 by, for example, laser welding, as shown in FIG. 1.

The rotor 10 includes a shaft 14 and a rotor hub 12 fixed to the shaft 14. The shaft 14 is coaxial with the rotation axis X and extends along the rotation axis X. The shaft 14 has a shaft flange 14a at its lower end. The rotor hub 12 includes an upper portion 12a and a sidewall portion 12b extending axially downward from the outer periphery of the upper portion 12a. The upper portion 12a is in the form of a generally circular plate in this preferred embodiment. A rotor magnet 16 is attached to the inner surface of the sidewall portion 12b in a radial direction substantially perpendicular to the rotation axis X. The rotor magnet 16 is bonded to the sidewall portion 12b with adhesive, for example.

The sleeve 6 is an elongated member having an axially extending space therein. The inner surface of the sleeve 6 which defines the space is opposed to the shaft 14 with a small gap in the radial direction. In the axial direction, the lower surface of the sleeve 6 is opposed to the upper surface of the shaft flange 14a with a small gap, and the upper surface of the plate 11 is opposed to the lower surface of the shaft flange 14a with a small gap. The aforementioned small gaps formed inside the housing 4 are filled with oil 3. The opposing surfaces of the sleeve 6 and the shaft 14 and the oil 3 therebetween form a radial dynamic pressure bearing. The opposing surfaces of the sleeve 6 and the shaft flange 14a and the oil 3 therebetween, and the opposing surfaces of the plate 11 and the shaft flange 14a and the oil 3 therebetween form thrust dynamic pressure bearings. Two or more radial dynamic pressure bearings may be arranged along the rotation axis X while being separated from each other. While the rotor 10 is rotating, the inner pressure of the oil 3 is increased by a dynamic pressure effect, so that the rotor 10 levitates and is stably kept in the levitated state.

Referring to FIG. 1, a seal member 5 is attached to the upper end of the sleeve 6. The seal member 5 forms together with the shaft 14 a tapered capillary seal portion therebetween, thereby preventing leak of the oil 3.

A motor stator 7 is fixed to the bracket 2 so as to be opposed to the rotor magnet 16 in the radial direction, as shown in FIG. 1. The motor stator 7 includes a stator core stack 8 and coil windings 9 around the stator core stack 8. The stator core stack 8 is formed by laminating a plurality of annular thin metal plates. In this preferred embodiment, silicon steel plates are used for forming the stator core stack 8.

The spindle motor 1 of this preferred embodiment is a three-phase brushless motor controlled by PWM control. An FPC (flexible printed circuit) 30 is fixed to the lower surface of the bracket 2 and has four land portions. Ends of winding wires of the three phases are electrically connected to three of the four land portions of the FPC 30 while other ends are electrically connected to the remaining one land portion. The electrical connection between the winding wires and the respective land portions is achieved by soldering, for example. The FPC 30 is electrically connected to an external power supply and a control circuit (both not shown). When a current is supplied to the motor stator 7 from the external power supply and the control circuit via the FPC 30, the rotor 10 rotates about the rotation axis X.

Although the bracket 2 and the base 53 to which the bracket 2 is attached are separately formed from each other in this preferred embodiment, they may be formed integrally with each other. In addition, the structure and arrangement of the bearings are not limited to the above.

Referring to FIGS. 2A and 2B, 3, 5, and 6, the structure of the motor stator 7 of this preferred embodiment is now described in more detail.

Figure 2A:
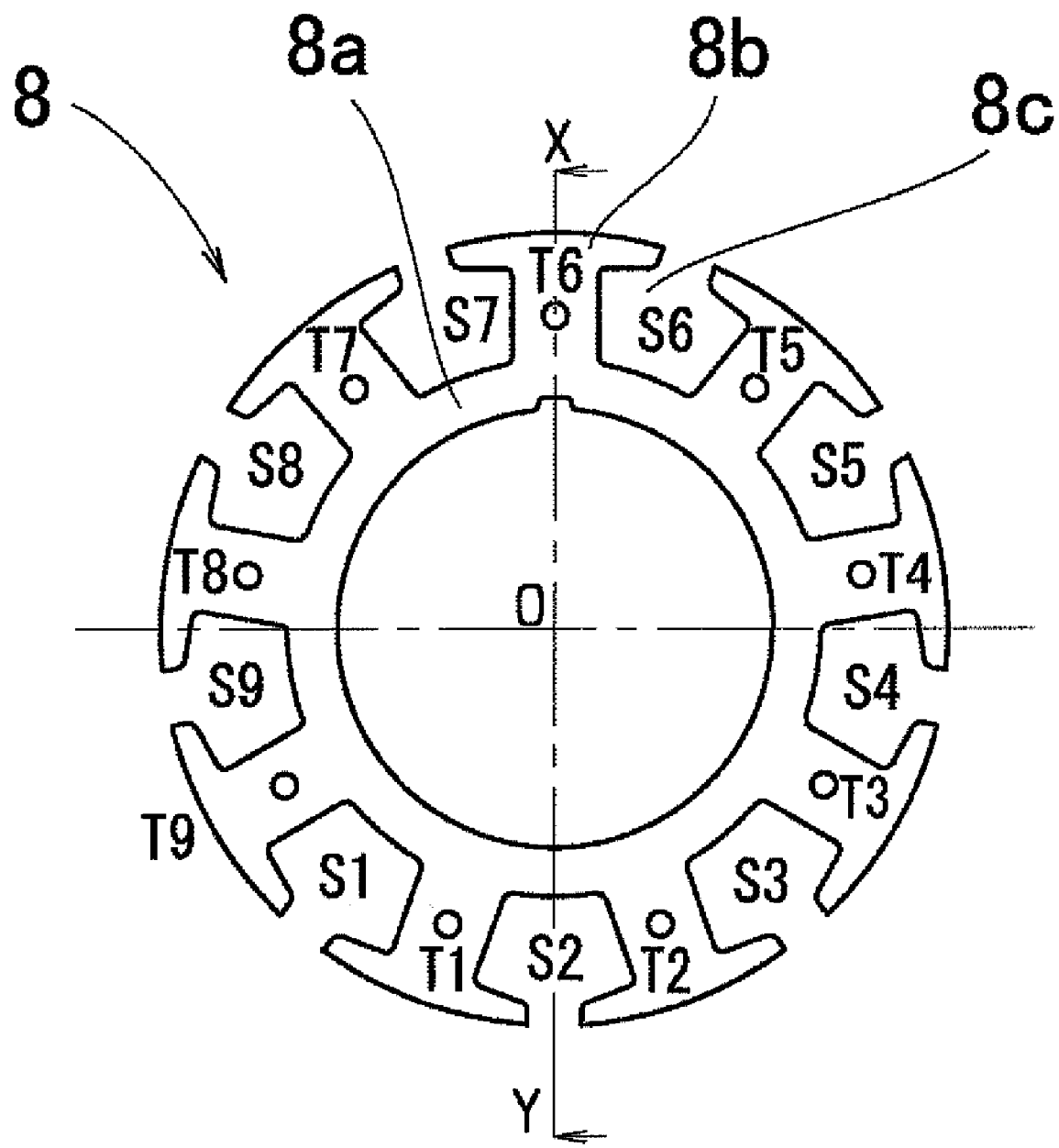
FIG. 2A shows a stator core stack of the spindle motor of FIG. 1.
Figure 2B:
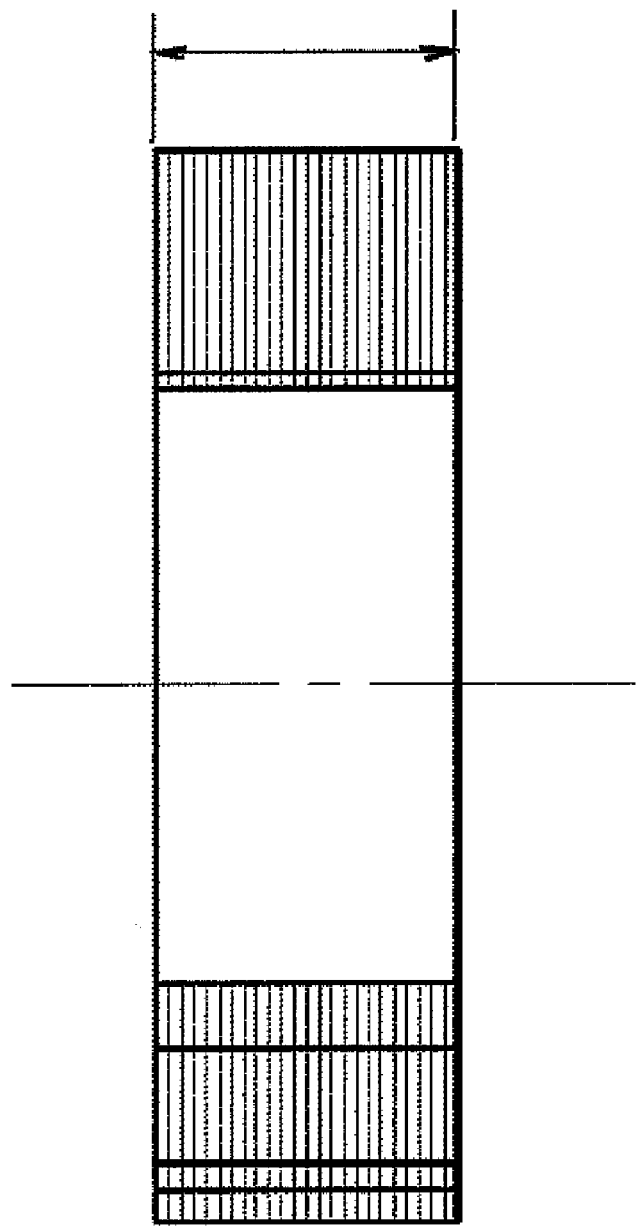
FIG. 2B is a cross-sectional view of the stator core stack of FIG. 2A, taken along line X-O-Y in FIG. 2A.

As shown in FIGS. 2A, 2B, and 3, the stator core stack 8 is formed by laminating a plurality of thin plates and has an annular core back 8a and a plurality of teeth 8b radially extending from the core back 8a. In this preferred embodiment, the stator core stack 8 includes nine teeth 8b and nine slots 8c each defined by adjacent teeth 8b and the core back 8a, as shown in FIGS. 2A and 3. The spindle motor 1 of this preferred embodiment is a three-phase brushless motor having U-phase coil windings, V-phase coil windings, and W-phase coil windings. A winding wire of each phase is wound around every third tooth 8b N times to form coil windings 9 (see FIG. 1). The winding ends of the winding wires of the three phases are arranged to exit from the same slot and are electrically connected to a common node as a neutral point. The winding wire of each phase is a non-self-bonding type wire which does not include any bonding layer.

FIG. 3 illustrates the motor stator 7. In this preferred embodiment, each slot 8c is narrow in the motor stator 7. Therefore, it is very difficult to wind a winding wire of each phase around a corresponding tooth a large number of times or make the winding wire pass through a limited space in each slot 8c, because breakage of the winding wire may be caused by contact between portions of the winding wire or twist of the winding wire. In this preferred embodiment, the distance between adjacent ends of the teeth 8b is about 1.3 mm, the outer diameter of the winding wire is about 0.3 mm, and the axial length of the stator core stack 8 is about 6.0 mm, as shown in FIGS. 2B and 3. The smaller the distance between the adjacent ends of the teeth 8b is, or the larger the outer diameter of the winding wire is, or the larger the axial length of the stator core stack 8 is, the more difficult it is to wind the winding wire around the teeth 8b.

Figure 5:
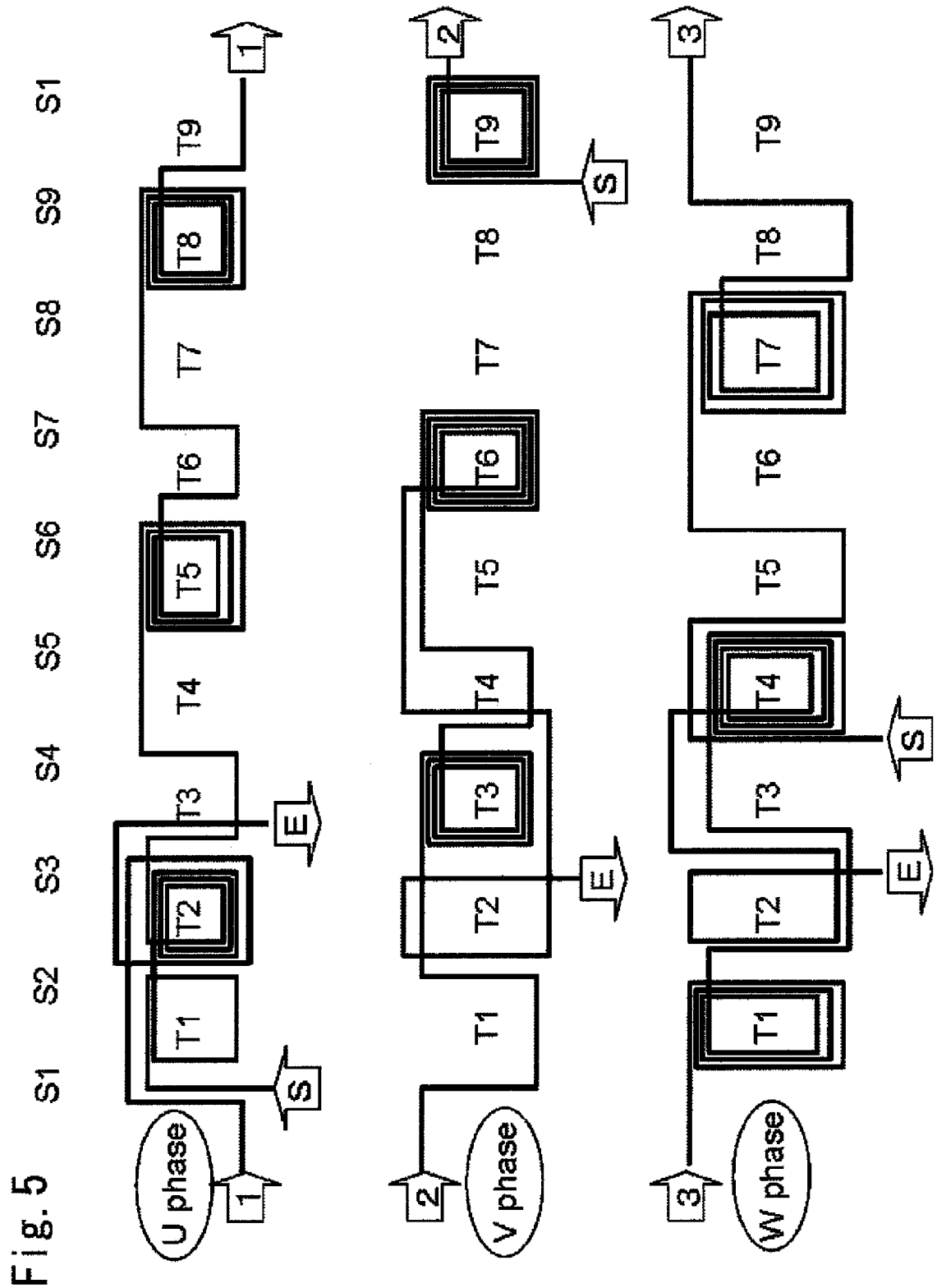
FIG. 5 illustrates a conventional winding sequence.
Figure 6:
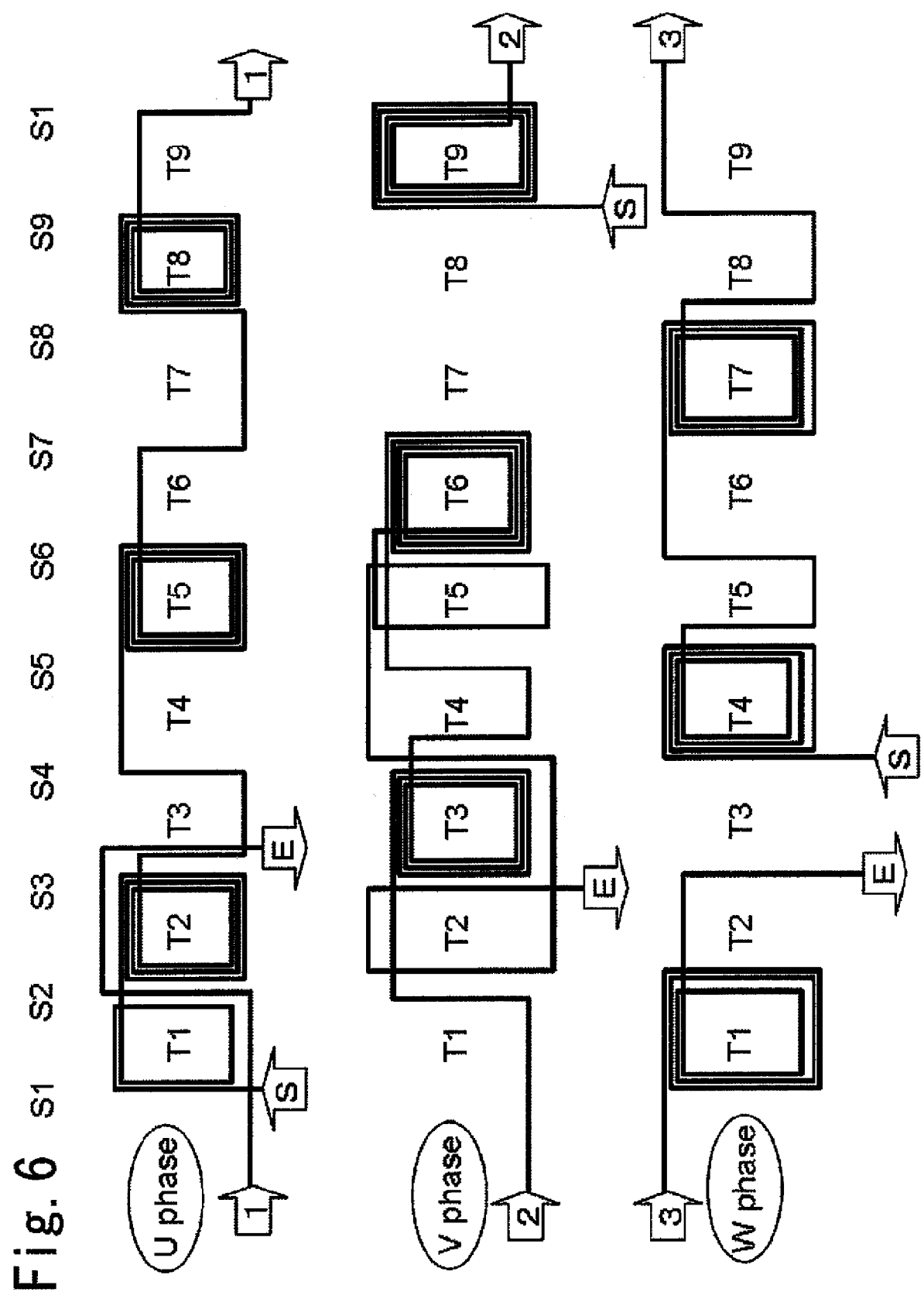
FIG. 6 illustrates a winding sequence according to the first preferred embodiment of the present invention.

The sequence for winding the winding wires of three phases around the teeth 8b to form coil windings 9 is now described, referring to FIGS. 5 and 6. FIG. 5 illustrates a conventional sequence and FIG. 6 illustrates the sequence according to this preferred embodiment. The differences between those sequences are mainly described. FIGS. 5 and 6 are developed views of the stator core stack 8 when the core back 8a is seen from the teeth 8b. Solid line represents winding wires which are wound around the teeth 8b. Arrow S and arrow E which are shown at ends of solid line represent start and end of winding, respectively. For the sake of convenience, nine teeth 8b in this preferred embodiment are labeled with T1 to T9 in order to be distinguished from one another. Similarly, nine slots 8c are labeled with S1 to S9.

The conventional winding sequence is now described referring to FIG. 5.

V phase is selected as the first phase for which winding is performed first. Winding of the V-phase winding wire starts from the lower portion of Slot 9, is wound around Tooth 9 in a clockwise direction N times, passes through Slot 1 downward, passes below Tooth 1, passes through Slot 2 upward, passes over Tooth 2, and is wound around Tooth 3 in the clockwise direction N times. Then, the V-phase winding wire passes through Slot 4 downward, passes below Tooth 4, passes through Slot 5 upward, passes over Tooth 5, and is wound around Tooth 6 in the clockwise direction N times. Then, the V-phase winding wire passes through Slot 6 upward, passes over Tooth 5 and Tooth 4 in that order, passes through Slot 4 downward, passes below Tooth 3 and Tooth 2 in that order, and is wound around Tooth 2 in the clockwise direction n times in order to prevent loosening of the V-phase winding wire. Finally, the V-phase winding wire is pulled out from Slot 3 downward.

Then, W phase is selected as the second phase for which winding is performed next. Winding of the W-phase winding wire starts from the lower portion of Slot 4. The W-phase winding wire passes over Tooth 4, passes through Slot 5 downward, passes below Tooth 5, passes through Slot 6 upward, passes over Tooth 6, and is wound around Tooth 7 in the clockwise direction N times. Then, the W-phase winding wire passes through Slot 8 downward, passes below Tooth 8, passes through Slot 9 upward, passes over Tooth 9, and is wound around Tooth 1 in the clockwise direction N times. Then, the W-phase winding wire passes through Slot 2 downward, passes below Tooth 2, passes through Slot 3 upward, passes over Tooth 3, and is wound around Tooth 4 in the clockwise direction (N+1) times. Subsequently, the W-phase winding wire passes through Slot 4 upward, passes over Tooth 3, passes through Slot 3 downward, and is wound around Tooth 2 in the clockwise direction n times in order to prevent loosening of the W-phase winding wire. Finally, the W-phase winding wire is pulled out from Slot 3 downward.

U phase is selected as the third phase for which winding is performed third. Winding starts from the lower portion of Slot 1. The U-phase winding wire is wound around Tooth 1 in the clockwise direction n times in order to prevent loosening of the U-phase winding wire and is then wound around Tooth 2 in the clockwise direction N times. The U-phase winding wire then passes through Slot 3 downward, passes below Tooth 3, passes through Slot 4 upward, passes over Tooth 4, and is wound around Tooth 5 in the clockwise direction N times. Then, the U-phase winding wire passes through Slot 6 downward, passes below Tooth 6, passes through Slot 7 upward, passes over Tooth 7, and is wound around Tooth 8 in the clockwise direction N times. Subsequently, the U-phase winding wire passes through Slot 9 downward, passes below Tooth 9, passes through Slot 1 upward, passes over Tooth 1, and is wound around Tooth 2 in the clockwise direction n times in order to prevent loosening of the U-phase winding wire. Finally, the U-phase winding wire is pulled out from Slot 3 downward. That is, all the three winding wires are pulled out from Slot 3 and are electrically connected to a common node as a neutral point.

In accordance with the above winding sequence, the number of turns of the winding of each phase can be made closer to those of other phases. Moreover, loosening of each winding wire can be prevented. However, winding for preventing loosening of the winding wire is carried out on Tooth 2 for all phases. Therefore, mutual inductances between the phases are not adjusted sufficiently.

Next, the winding sequence according to this preferred embodiment is described referring to FIG. 6.

V phase is selected as the first phase for which winding is performed first. Winding of the V-phase winding wire starts from the lower portion of Slot 9, is wound around Tooth 9 in the clockwise direction N times, passes through Slot 1 downward, passes below Tooth 1, passes through Slot 2 upward, passes over Tooth 2, and is wound around Tooth 3 in the clockwise direction N times. Then, the V-phase wire passes through Slot 4 downward, passes below Tooth 4, passes through Slot 5 upward, passes over Tooth 5, and is wound around Tooth 6 in the clockwise direction N times. Subsequently, the V-phase winding wire passes through Slot 6 upward and is wound around Tooth 5 in a counterclockwise direction n times in order to prevent loosening of the V-phase winding wire and cancel the number of turns. Then, the V-phase winding wire passes over Tooth 4, passes through Slot 4 downward, passes below Tooth 3, and is wound around Tooth 2 in the clockwise direction n times in order to loosening of the V-phase winding wire. Finally, the V-phase winding wire is pulled out from Slot 3 downward.

Then, w phase is selected as the second phase for which winding is performed next. Winding of the W-phase winding wire starts from the lower portion of Slot 4. The W-phase winding wire is wound around Tooth 4 in the clockwise direction N times, passes through Slot 5 downward, passes below Tooth 5, passes through Slot 6 upward, passes over Tooth 6, and is wound around Tooth 7 in the clockwise direction N times. Then, the W-phase winding wire passes through Slot 8 downward, passes below Tooth 8, passes through Slot 9 upward, passes over Tooth 9, and is wound around Tooth 1 in the clockwise direction N times. Then, the W-phase wire is pulled out from Slot 3 downward.

U phase is selected as the third phase for which winding is performed third. Winding starts from the lower portion of Slot 1. The U-phase winding wire is wound around Tooth 1 in the clockwise direction n times in order to prevent loosening of the U-phase winding wire and is then wound around Tooth 2 in the clockwise direction N times. The U-phase winding wire then passes through Slot 3 downward, passes below Tooth 3, passes through Slot 4 upward, passes over Tooth 4, and is wound around Tooth 5 in the clockwise direction N times. Then, the U-phase winding wire passes over Tooth 6, passes through Slot 7 downward, passes below Tooth 7, passes through Slot 8 upward, and is wound around Tooth 8 in the clockwise direction N times. Subsequently, the U-phase winding wire passes over Tooth 9, passes through Slot 1 downward, passes below Tooth 1, passes through Slot 2 upward, and passes over Tooth 2. Finally, the U-phase winding wire is pulled out from Slot 3 downward. All the three winding wires are pulled out from Slot 3 and are electrically connected to a common node as a neutral point.

In accordance with the winding sequence of this preferred embodiment, the number of turns of winding in each phase is approximately the same as those for other phases. Also, around both Teeth 2 and 5 on which winding for preventing loosening of the V-phase winding wire is performed, the U-phase winding wire is wound N times. Therefore, there is no substantial effect of mutual inductance between teeth.

In this preferred embodiment, the U-phase winding wire is wound around Tooth 5 in the counterclockwise direction n times in order to prevent loosening of the U-phase winding wire and cancel the number of turns of winding. In general, winding in the opposite direction has various difficulties of manufacturing technique. For example, winding of the winding wire in the opposite direction may change the position of the stator core relative to a wire winding machine, thus making positional adjustment of a nozzle of the wire winding machine from which the winding wire is supplied difficult, or may cause twist of the winding wire. Moreover, when the winding in the opposite direction is performed, it is more likely that a portion of the winding wire is caught by a previously wound portion thereof and is broken. However, in accordance with the winding sequence of this preferred embodiment, it is almost unnecessary to worry about those difficulties because winding of the U-phase winding wire in the opposite direction is carried out on the tooth 8b around which no winding wire is wound.

In addition, in the winding of the U-phase winding wire which is performed third, there is small room in Slot 3 from which the ends of the winding wires of three phases are pulled out because the winding wires of other phases pass through Slot 3. Therefore, it is not likely that loosening of the U-phase winding wire occurs. For the aforementioned reason, the last winding for preventing loosening and for canceling the number of turns of winding is omitted in this preferred embodiment, considering workability.

Figure 10:
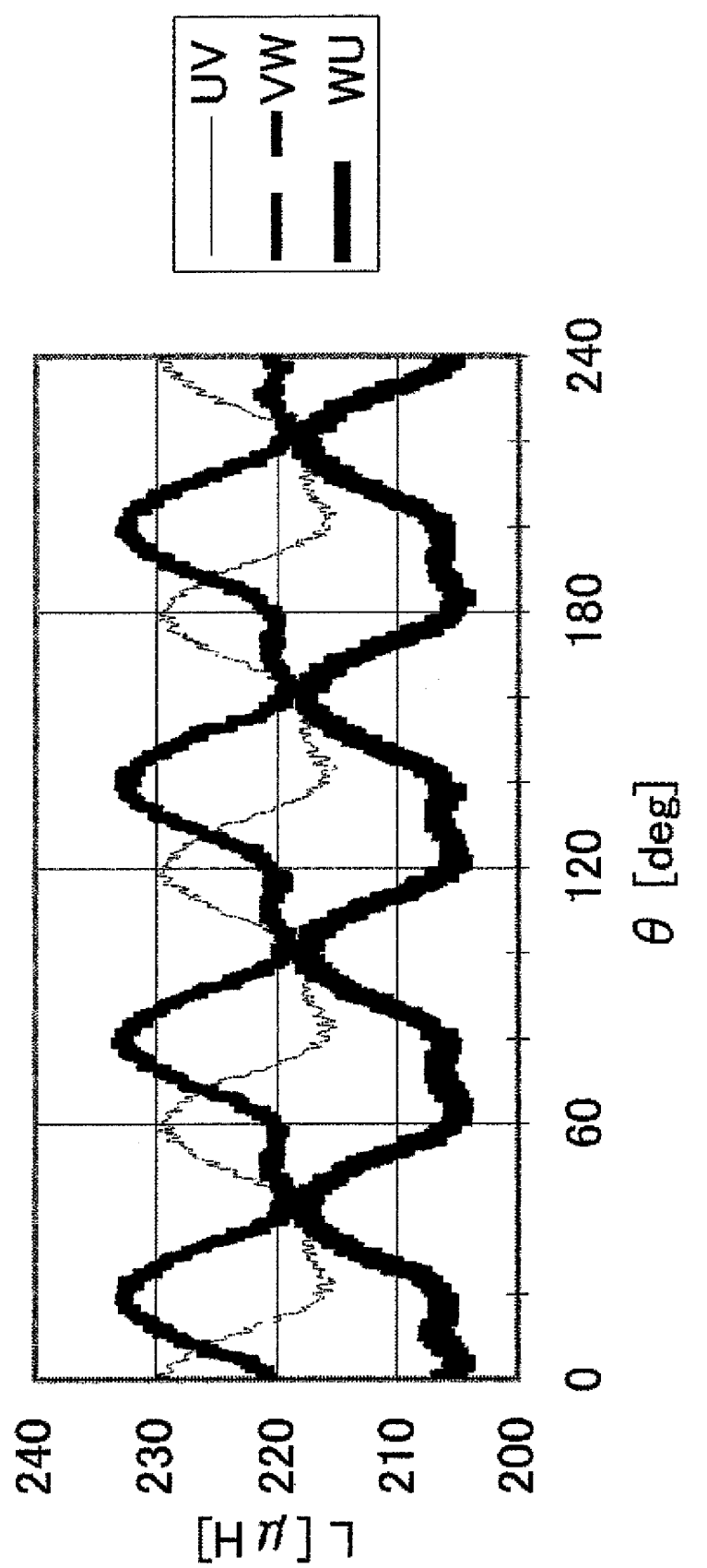
FIG. 10 shows measurement results of mutual inductances between phases of a motor stator including coils arranged around in accordance with the conventional winding sequence of FIG. 5.
Figure 11:
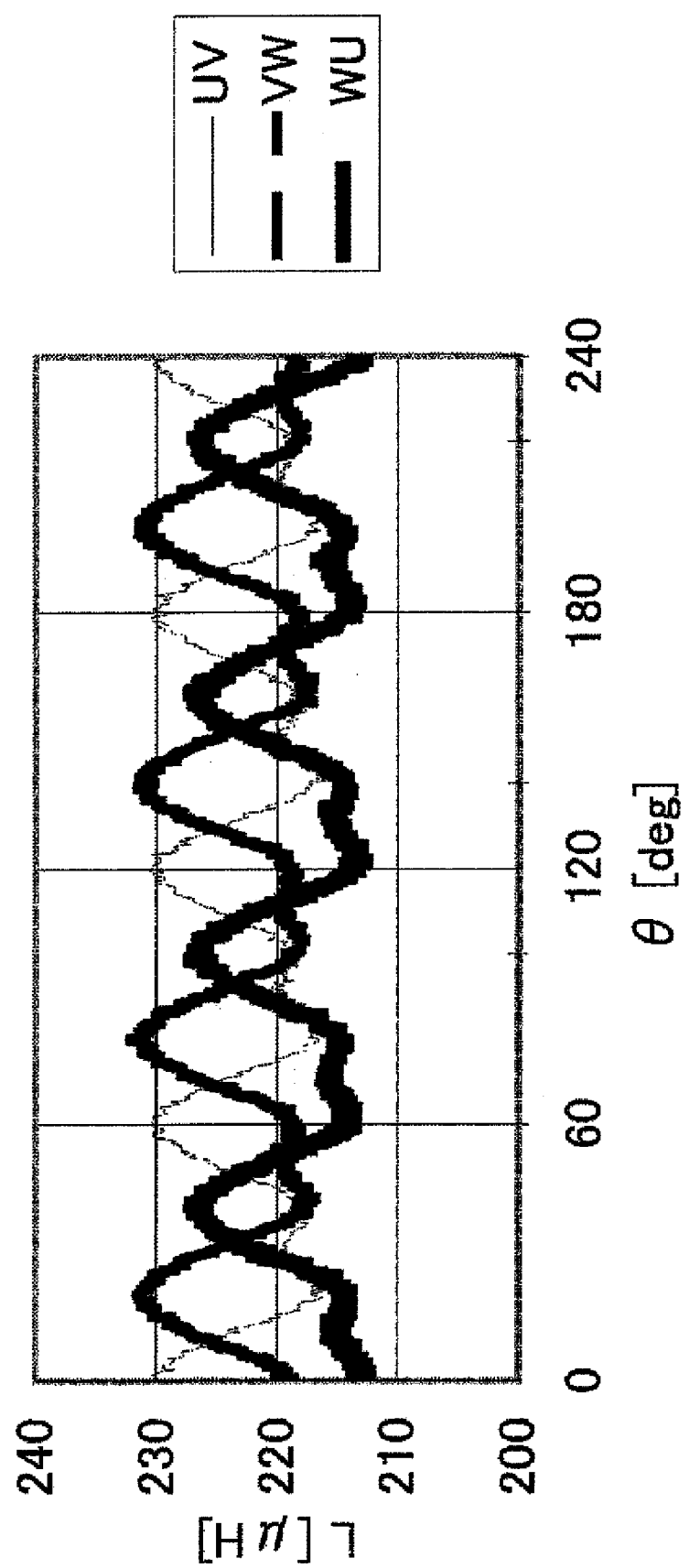
FIG. 11 shows measurement results of mutual inductances between phases of the motor stator according to the first preferred embodiment of the present invention.

FIG. 10 shows the measurement result of mutual inductances between phases of the stator core around which the coil windings were arranged in accordance with the winding sequence of FIG. 5. FIG. 11 shows the measurement result of mutual inductances between phases of the stator core around which the coil windings were arranged in accordance with the winding sequence of FIG. 6. Both the measurements were made under the condition that the wire diameter was large and the number of turns of winding was small in order to obtain a small counter-electromotive force. That condition is common to high-speed spindle motors. The smaller the number of turns of winding is, the more significant the effect of unequal number of turns of winding becomes. For example, the number of turns N is about 50 in spindle motors which do not rotate at high speeds, whereas N in high-speed spindle motors is about a half. Thus, in the measurements were made with, N and n were set to 22 and 1, respectively. The curves in FIGS. 10 and 11 show changes in mutual inductances between phases, i.e., mutual inductance between U and V phases, mutual inductance between V and W phases, and mutual inductance between W and U phases with respect to a rotational angle of the rotor 10.

FIG. 10 shows that the three mutual inductances between phases were not the same as each other. In the stator core with the coil windings arranged in accordance with the sequence of FIG. 5, the mutual inductance between V and W phases was the largest and the mutual inductance between W and U phases was the smallest. The difference between them was about 7% (about 15 μH). The values of the three mutual inductances between phases did not become the same. Therefore, it seems difficult to obtain the rotation speed from that data.

On the other hand, FIG. 11 shows that the differences between three mutual inductances between phases were about 2% (about 5 μH). This means that, although there is some inevitable error, it is possible to obtain the direction and the speed of rotation and perform highly efficient control by PWM control without practical problem.

Second Preferred Embodiment

Figure 7:
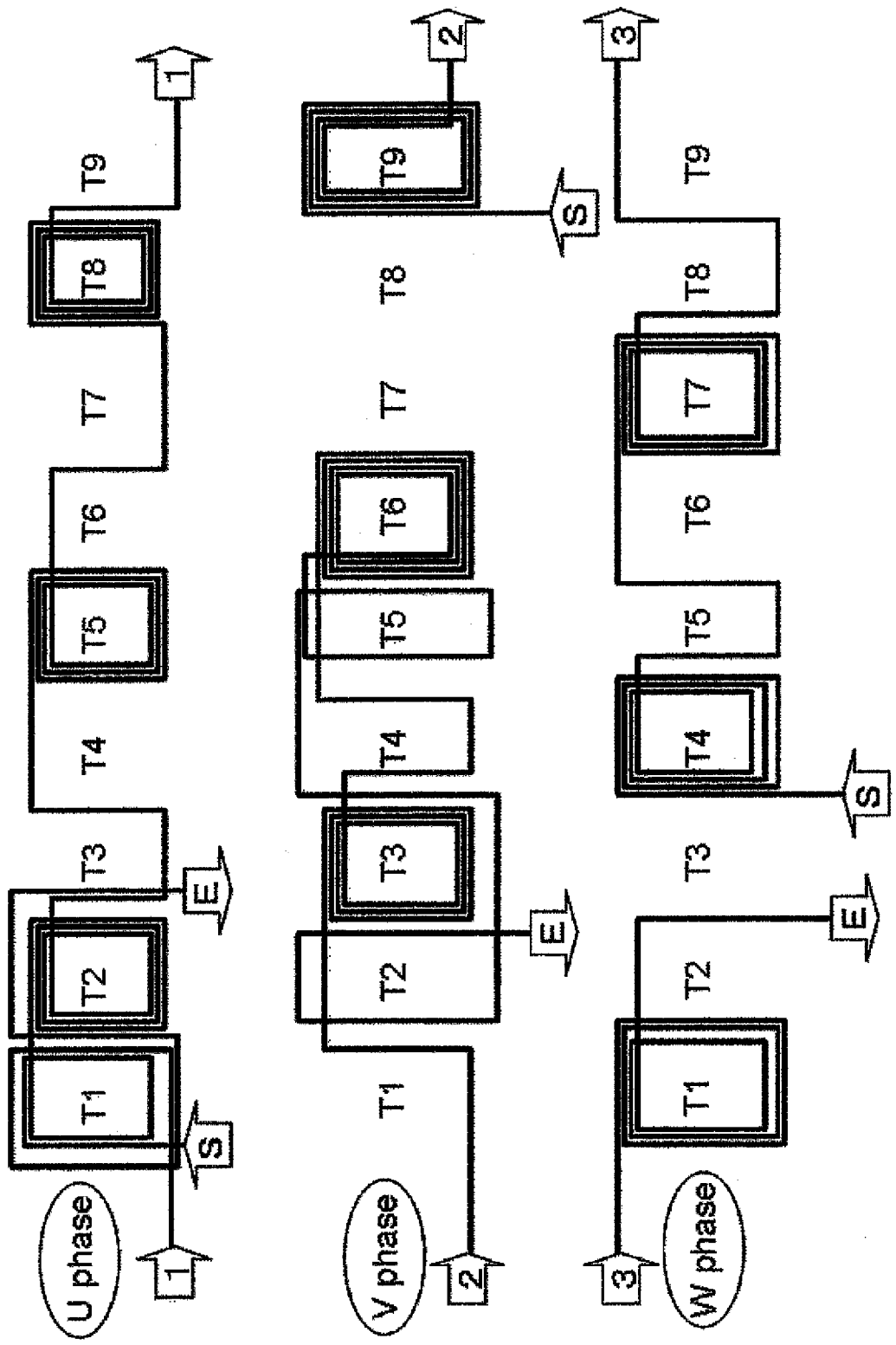
FIG. 7 illustrates a winding sequence according to the second preferred embodiment of the present invention.
Figure 12:
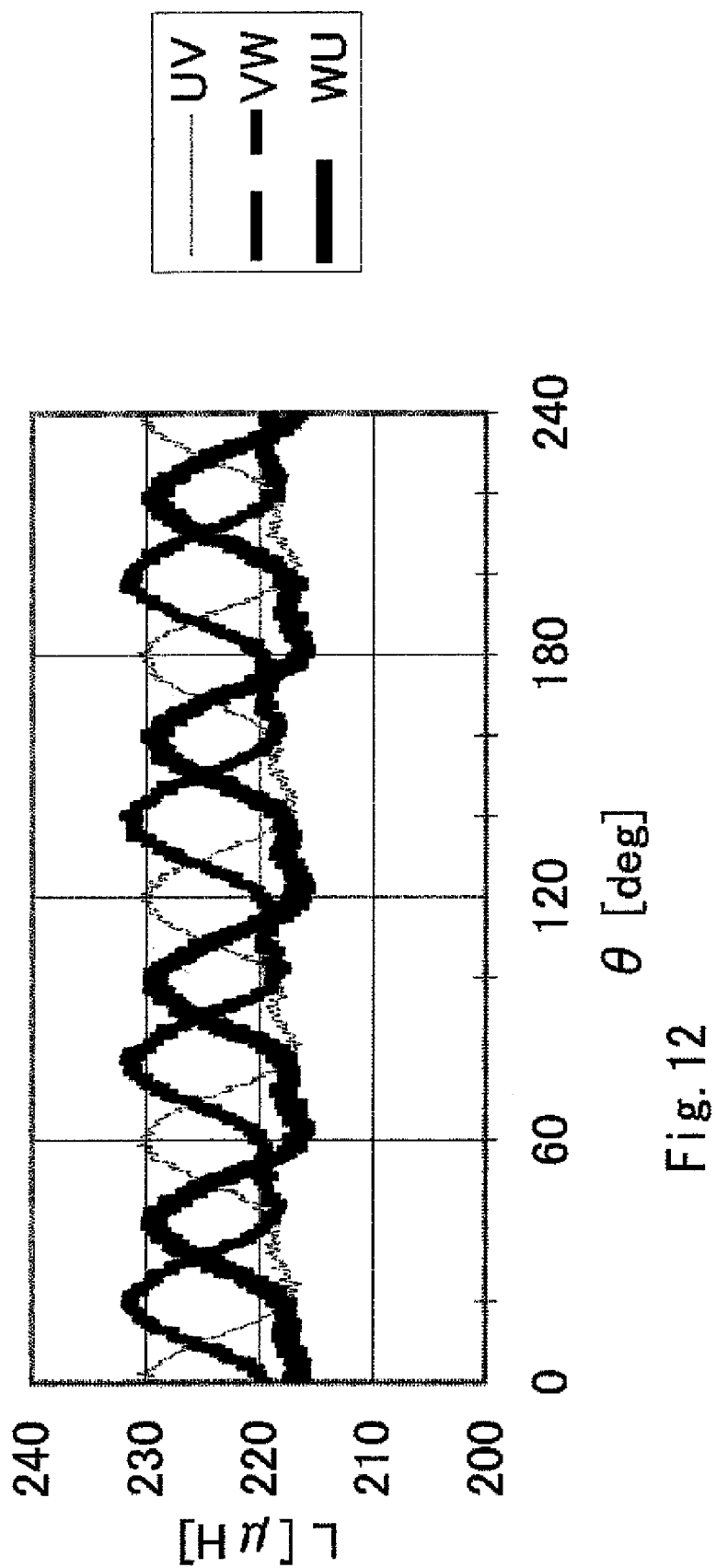
FIG. 12 shows measurement results of mutual inductances between phases of the motor stator according to the second preferred embodiment of the present invention.

A spindle motor and a motor stator of a second preferred embodiment of the present invention are now described referring to FIGS. 7 and 12. The spindle motor and its stator of the second preferred embodiment are basically the same as those described in the first preferred embodiment and therefore the detailed description of the structure thereof is omitted here. As the winding wire of each phase, a non-self-bonding wire which does not include a bonding layer is used as in the first preferred embodiment. The winding sequence of a winding wire of each phase to form the coil windings 9 is also the same as that of the first preferred embodiment shown in FIG. 6, except for the last step of the U-phase winding wire winding sequence performed third. Therefore, the description of the V-phase and W-phase winding wire windings is omitted and only the U-phase winding wire winding is described referring to FIG. 7.

U-phase is selected as the third phase for which winding is performed third. The winding starts from the lower portion of Slot 1, is wound around Tooth 1 in the clockwise direction n times in order to prevent loosening of the U-phase winding wire, and is then wound around Tooth 2 in the clockwise direction N times. Then, the U-phase winding wire passes through Slot 3 downward, passes below Tooth 3, passes through Slot 4 upward, passes over Tooth 4, and is wound around Tooth 5 in the clockwise direction N times. The U-phase winding wire passes over Tooth 6, passes through Slot 7 downward, passes below Tooth 7, passes through Slot 8 upward, and is wound around Tooth 8 in the clockwise direction N times. Subsequently, the U-phase winding wire passes through Slot 9 downward, passes below Tooth 9, and is wound around Tooth 1 in the counterclockwise direction n times in order to prevent loosening of the U-phase winding wire and cancel out the number of turns of winding. Then, the U-phase winding wire passes through Slot 2 upward, passes over Tooth 2, and is pulled out from Slot 3 downward. The three winding wires pulled out from Slot 3 are electrically connected to a common node.

In accordance with the above winding sequence, the number of turns of winding is 3N for each phase. That is, the numbers of turns of winding of three phases are the same. Moreover, there is no substantial effect of mutual inductance between Teeth 2 and 5 on which winding for preventing loosening of the V-phase winding wire is performed, because the U-phase winding wire is wound around both Teeth 2 and 5 N times. Furthermore, unlike the first preferred embodiment, the U-phase winding wire is wound around Tooth 1 in the clockwise direction n times in order to prevent loosening thereof and is thereafter wound around the same tooth, i.e., Tooth 1 in the counterclockwise direction n times in order to prevent loosening thereof and cancel the number of turns of winding. Therefore, there is no substantial effect from a viewpoint of mutual inductance between teeth and a viewpoint of counter-electromotive force.

FIG. 12 shows the measurement result of mutual inductance between phases of the stator core with the coil windings arranged in accordance with the winding sequence of FIG. 7. The condition including the number of turns of winding and the wire diameter is the same as that in the first preferred embodiment. Three mutual inductances between phases, i.e., the mutual inductance between U and v phases, the mutual inductance between V and W phases, and the mutual inductance between W and U phases varied in a range from about 220 μH to about 230 μH, as shown in FIG. 12. Therefore, the mutual inductances between phases are substantially equal to each other, allowing the rotating direction and the rotating speed to be precisely obtained. This means that the winding sequence of this preferred embodiment enables the motor to be highly efficiently controlled by PWM control.

The U-phase winding wire is wound around Tooth 1 n times in the counterclockwise direction at the end of winding in order to prevent loosening thereof and cancel the number of turns of winding. This end portion of the U-phase winding wire can be easily broken because the winding wire is twisted. In particular, there is small space for U phase because winding of the U-phase winding wire is performed third. Due to this, troubles, e.g., disconnection can easily occur. Therefore, it is selected whether or not the winding for canceling the number of turns of winding is to be performed, in accordance with the motor specification, e.g., the dimensions and required characteristics of the motor, or the manufacturing cost.

Third Preferred Embodiment

A spindle motor according to a third preferred embodiment of the present invention is now described referring to FIGS. 4A, 4B, 4C, 8, and 13. The structure of the spindle motor of this preferred embodiment is basically the same as those of the first and second preferred embodiments and therefore the detailed description thereof is omitted. In this preferred embodiment, a non-self-bonding wire which does not include a bonding layer is used as the winding wire of each phase as in the first and second preferred embodiments.

Figure 4A:
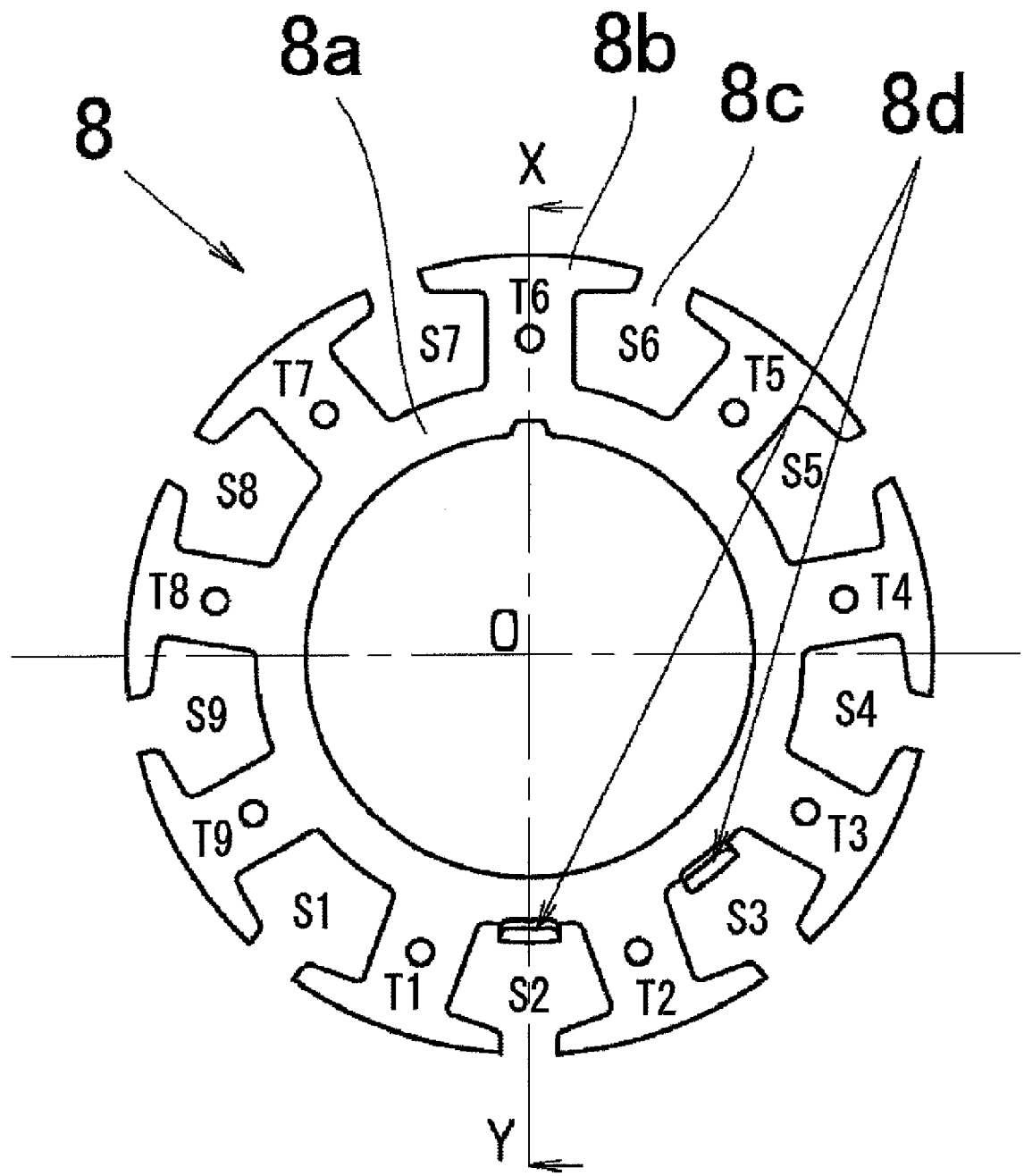
FIG. 4A shows a stator core stack of the spindle motor according to a third preferred embodiment of the present invention.

As shown in FIG. 4A, the stator core stack 8 includes a plurality of annular metal thin plates that are laminated. For example, each annular thin metal plate is a silicon steel plate. The stator core stack 8 includes an annular core back 8a and a plurality of teeth 8b extending radially outwardly from the core back 8a. In this preferred embodiment, the stator core stack 8 is formed by laminating twenty four metal thin plates. The stator core stack 8 also includes nine tooth 8b and nine slots 8b each defined by adjacent teeth 8b and the core back 8a.

Figure 4B:
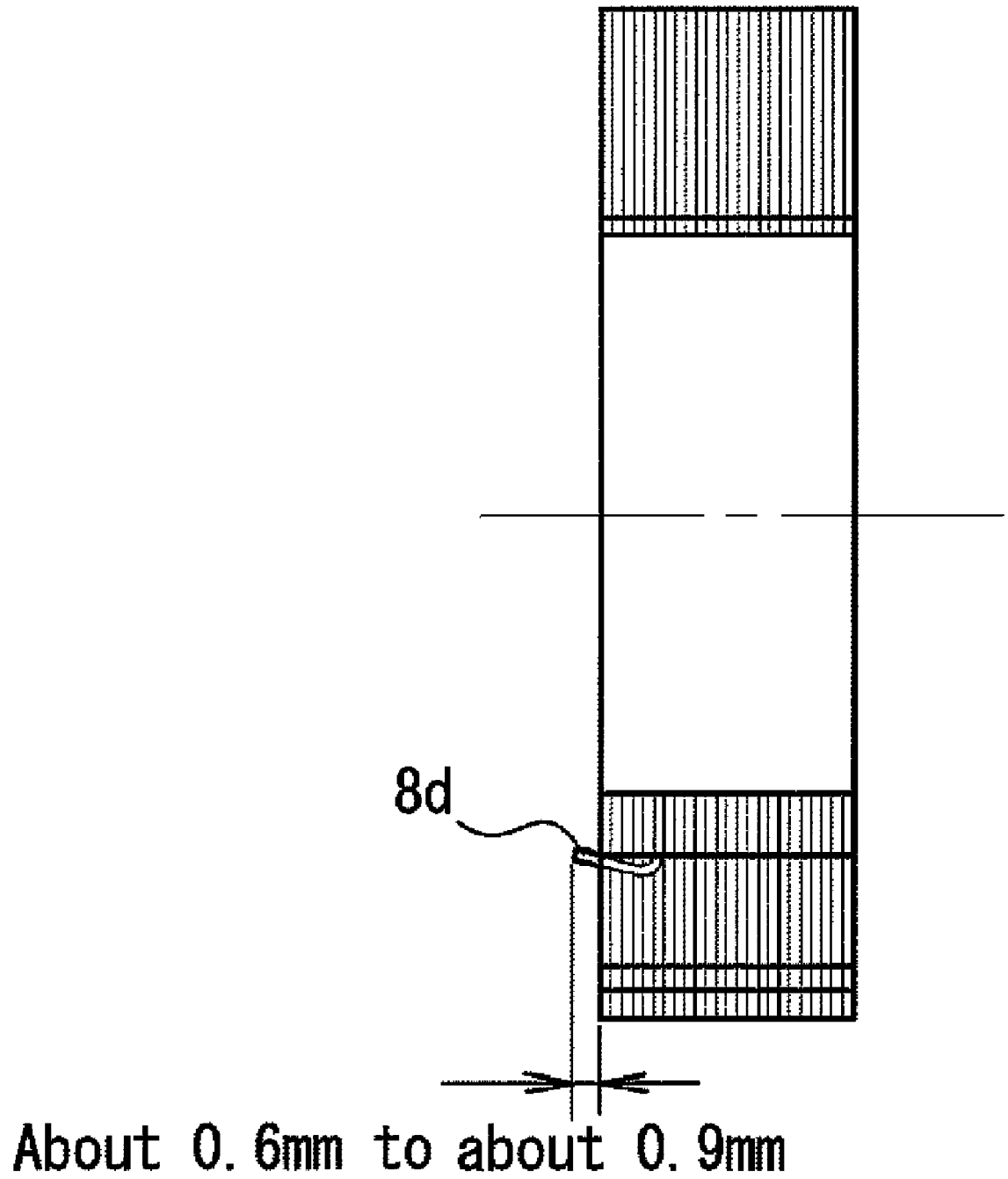
FIG. 4B is a cross-sectional view of the stator core stack of FIG. 4A, taken along line X-O-Y in FIG. 4A.
Figure 4C:
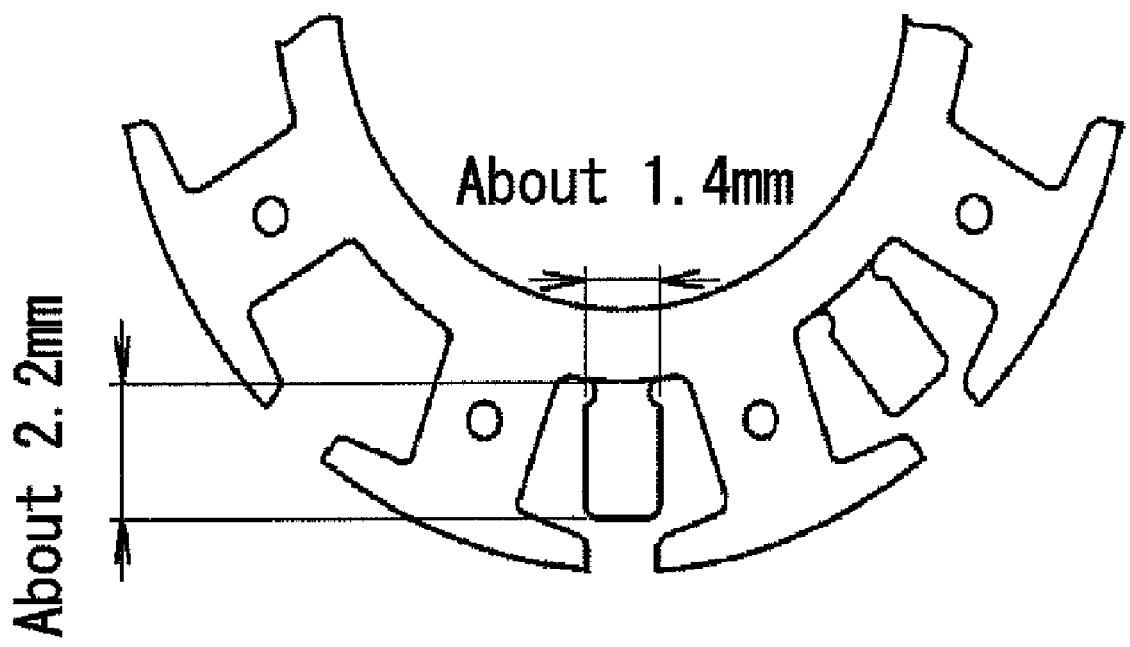
FIG. 4C shows a portion of the stator core stack of FIG. 4A.

One of the twenty four metal thin plates has at least one retainer 8d between adjacent teeth 8b, as shown in FIG. 4C. The retainer 8d extends radially outwardly from the core back 8a. In this preferred embodiment, the length L of the retainer 8d is shorter than that of the tooth 8b but is longer than the thickness H of metal thin plate(s) stacked on the one metal thin plate having the retainer 8d. In this preferred embodiment, L is about 2.2 mm and H is about 0.25 mm×5=about 1.25 mm.

As shown in FIG. 4B, a predetermined number of metal thin plates (five in this preferred embodiment) are stacked on the metal thin plate having the retainer 8d. Then, the retainer 8d is bent approximately at a right angle toward a side of the metal thin plate on which the five metal thin plates having no retainer 8d are stacked. When L and H satisfy the aforementioned relationship, the retainer 8d projects beyond an end of the core back 8a in the axial direction. A portion of the retainer 8d is in contact with the outer circumferential surface of the core back 8a.

Alternatively, the retainer 8d may be bent approximately at a right angle with respect to a portion of the metal thin plate forming the core back 8a, prior to stacking of other metal plates.

The length I of a portion of the retainer 8d which projects from the axial end of the core back 8a is determined in accordance with the number of winding wires which are to be caught by the retainer 8d. The length of this portion is usually set such that winding wires, the number of which is larger than the number of winding wires to be actually caught by the retainer 8d by one or two, for example, can be caught by the retainer 8d.

In this preferred embodiment, the largest number of winding wires caught by a single retainer 8d is two, as described later. When the diameter of the winding wire is about 0.3 mm, the length I of the projecting portion of the retainer 8d is set to allow about three winding wires to be caught thereby, for example, about 0.9 mm. If this length I is the same as or smaller than the height (axial length) of the coil windings 9 arranged around the teeth 8b, this length I is acceptable from a viewpoint of dimensions of assembly.

Figure 8:
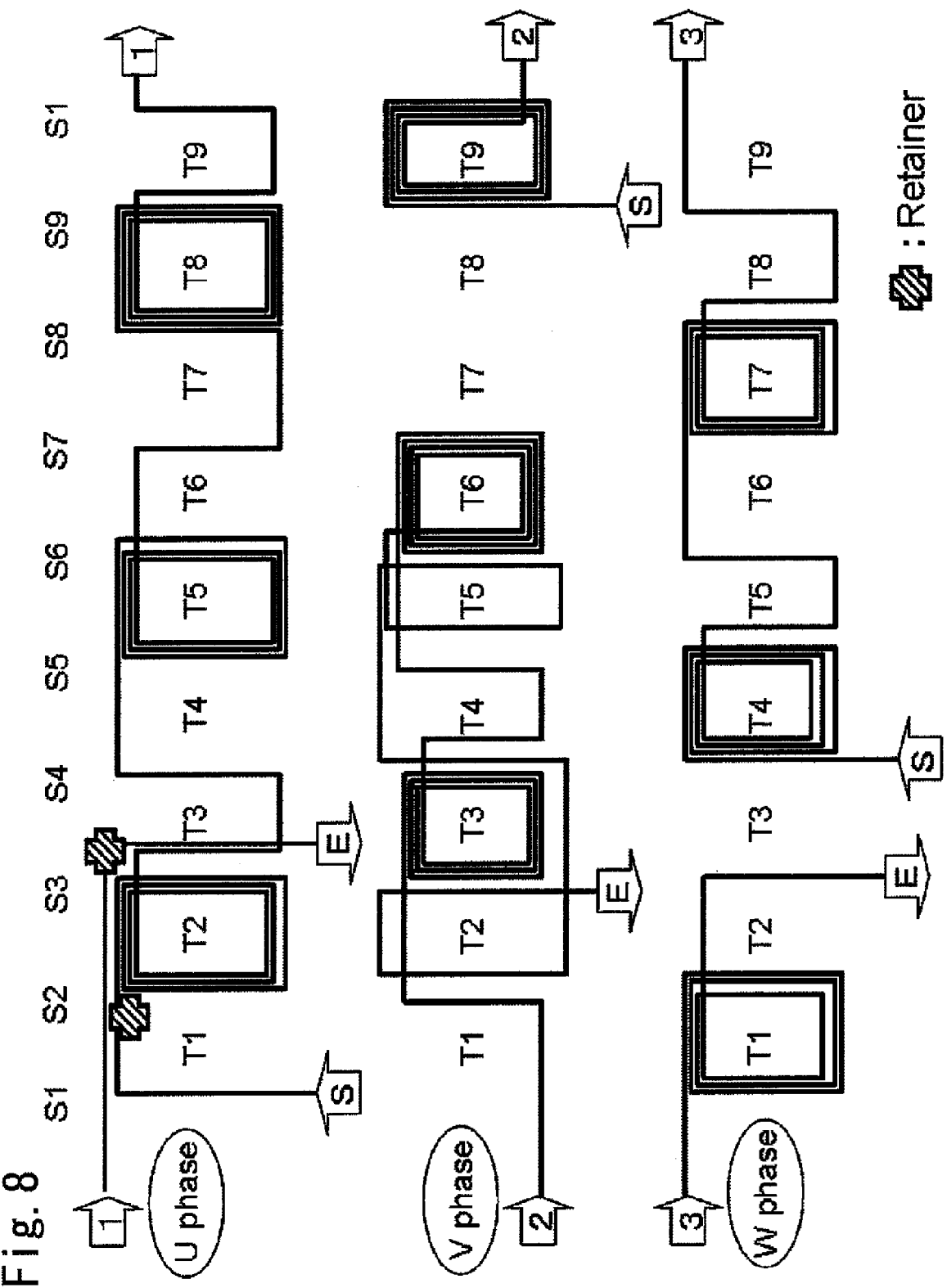
FIG. 8 illustrates a winding sequence according to the third preferred embodiment of the present invention.

Referring to FIG. 8, the sequence of winding a winding wire of each phase around the teeth 8b to form the coil windings 9 is described. Representation manner in FIG. 8 is the same as those in FIGS. 5 and 7. The retainer 8d is shown with hatching.

Winding of the V-phase winding wire and winding of the W-phase winding wire, which are performed first and second, are the same as those in the first and second preferred embodiments and therefore detailed description thereof is omitted.

U-phase is selected as the third phase for which winding is performed third. Winding of the U-phase winding wire starts from the lower portion of Slot 1, is wound around Retainer 2 in Slot 2 n times in order to prevent loosening of the U-phase winding wire, and is then wound around Tooth 2 in the clockwise direction N times. Then, the U-phase winding wire passes through Slot 3 downward, passes below Tooth 3, passes through Slot 4 upward, and is wound around Tooth 5 in the clockwise direction N times. Subsequently, the U-phase winding wire passes over Tooth 6, passes through Slot 7 downward, passes below Tooth 7, passes through Slot 8 upward, and is wound around Tooth 8 in the clockwise direction N times. Then, the U-phase winding wire passes through Slot 9 downward, passes below Tooth 9, passes through Slot 1 upward, passes over Teeth 1 and 2, and is wound around Retainer 3 in Slot 3 n times in order to prevent loosening of the U-phase winding wire. Finally, the U-phase winding wire is pulled out from Slot 3 downward. Three winding wires pulled out from Slot 3 are electrically connected to a common node as a neutral point.

In this preferred embodiment, two retainers 8d are provided. However, the number of the retainers is not limited thereto. The number of the retainers may be increased to simplifying the winding sequence by winding the winding wire around the retainers.

As described above, Retainers 2 and 3 are provided at positions corresponding to Slots 2 and 3 and winding of the U-phase winding wire for preventing loosening thereof is performed on Retainers 2 and 3. Thus, the number of turns of winding of each phase is 3N and the same as those of other phases. Moreover, around both Teeth 2 and 5 on which winding of the V-phase winding wire for preventing loosening is performed, the U-phase winding wire is wound N times. Thus, there is no substantial effect of mutual inductance between teeth. Therefore, mutual inductances between phases that have high equality can be obtained in a stable manner. Furthermore, winding for preventing loosening can be achieved only by winding the winding wire around the retainers 8*d* in the winding sequence of this preferred embodiment. Therefore, a force which can change the position of the stator core relative to a wire winding machine is not applied. This allows easy winding of the winding wire.

Figure 13:
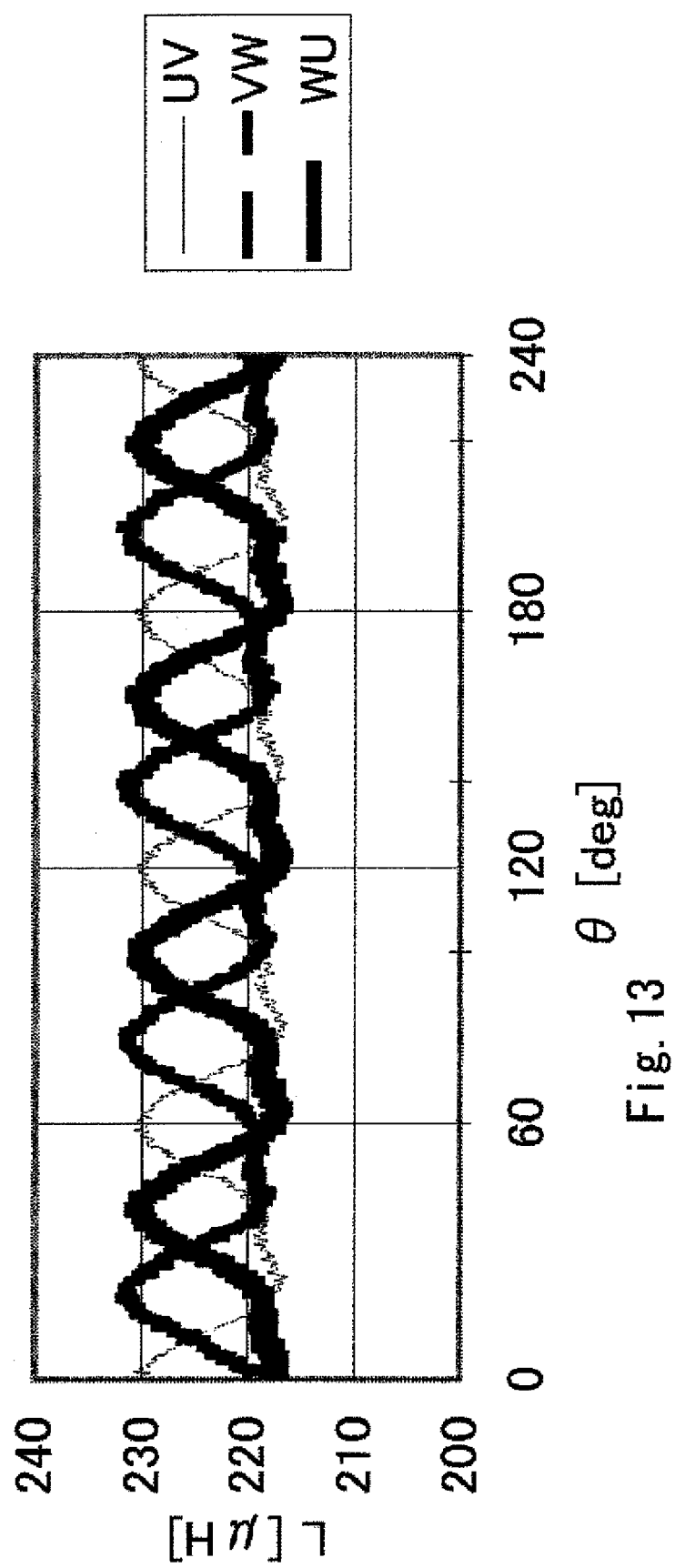
FIG. 13 shows measurement results of mutual inductances between phases of the motor stator according to the third preferred embodiment of the present invention.

FIG. 13 shows the measurement result of mutual inductances between phases of the stator core stack 8 with the coil windings 9 arranged in accordance with the winding sequence of FIG. 8. The stator specification, e.g., the number of turns of winding and the wire diameter is the same as those in the first and second preferred embodiments. FIG. 13 shows that three mutual inductances between phases, i.e., mutual inductances between U and V phases, between V and w phases, and between w and U phases varied in a range from about 220 μH to about 230 μH. Therefore, the three mutual inductances between phases are substantially equal to one another. This allows the direction and the speed of rotation of the motor to be obtained highly precisely, thus allowing the motor to be controlled highly efficiently by PWM control.

Fourth Preferred Embodiment

Figure 9:
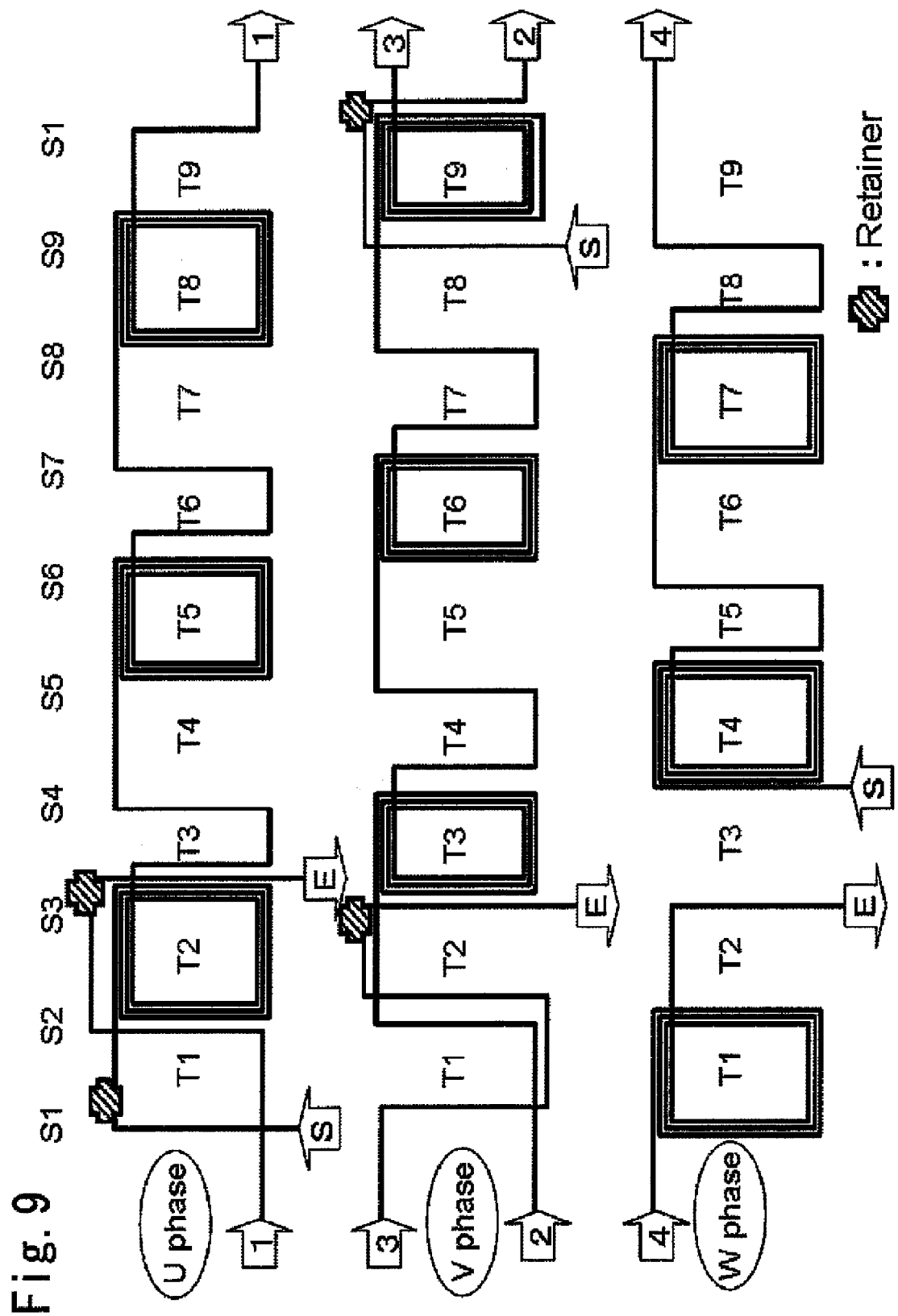
FIG. 9 illustrates a winding sequence according to the fourth preferred embodiment of the present invention.

A spindle motor according to a fourth preferred embodiment of the present invention is now described referring to FIG. 9. The structure of the spindle motor of this preferred embodiment is basically the same as that of the third preferred embodiment and the detailed description thereof is omitted. A non-self-bonding wire which does not include a bonding layer is used as the winding wire of each phase, as in the first to third preferred embodiments. As shown in FIG. 9, all windings for preventing loosening are carried out on the retainers 8*d*. The representation manner in FIG. 9 is the same as those in FIGS. 5 to 8.

V phase is selected as the first phase for which winding is performed first. Winding of the V-phase winding wire starts from the lower portion of Slot 9, is wound around Retainer 1 in Slot 1 n times in order to prevent loosening thereof, passes through Slot 1 downward, passes below Tooth 1, passes through Slot 2 upward, passes over Tooth 2, and is wound around Tooth 3 in the clockwise direction N times. Then, the V-phase winding wire passes through Slot 4 downward, passes below Slot 4, passes through Slot 5 upward, passes over Tooth 5, and is wound around Tooth 6 in the clockwise direction N times. Subsequently, the V-phase winding wire passes through Slot 7 downward, passes below Tooth 7, passes through Slot 8 upward, passes over Tooth 8, and is wound around Tooth 9 in the clockwise direction N times. Then, the V-phase winding wire passes through Slot 1 downward, passes below Tooth 1, passes through Slot 2 upward, and is wound around Retainer 3 n times in order to prevent loosening of the V-phase winding wire. Finally, the V-phase winding wire is pulled out from Slot 3 downward.

W phase is selected as the second phase for which winding is performed second. The sequence of winding the W-phase winding wire is the same as those in the first to third preferred embodiments and therefore the description thereof is omitted.

U phase is selected as the third phase for which winding is performed third. Winding of the U-phase winding wire starts from the lower portion of Slot 1. The U-phase winding wire is wound around Retainer 1 in Slot 1 n times in order to prevent loosening thereof, passes over Tooth 1, and is wound around Tooth 2 in the clockwise direction N times. Then, the U-phase winding wire passes through Slot 3 downward, passes below Tooth 3, passes through Slot 4 upward, passes over Tooth 4, and is wound around Tooth 5 in the clockwise direction N times. Subsequently, the U-phase winding wire passes through Slot 6 downward, passes below Tooth 6, passes through Slot 7 upward, passes over Tooth 7, and is wound around Tooth 8 in the clockwise direction N times. Then, the U-phase winding wire passes over Tooth 9, passes through Slot 1 downward, passes below Tooth 1, passes through Slot 2 upward, and is wound around Retainer 3 n times in order to prevent loosening of the U-phase winding wire. Finally, the U-phase winding wire is pulled out from Slot 3 downward. The three winding wires are electrically connected to a common node as a neutral point.

In accordance with the above winding sequence, the number of turns of winding is the same for each phase. In addition, there is no substantial affect of mutual inductances between teeth because winding for preventing loosening of the winding wire is not performed for the teeth 8*b*. Moreover, a magnetic field that is axially symmetric is generated for each phase. This enables stable rotation of the spindle motor 1. Furthermore, it is not necessary to apply a large force to the stator core stack 8 in order to prevent loosening of the winding wire. Therefore, the spindle motor can be manufactured reliably.

In the first, second, third, and fourth preferred embodiments, the motor stator 7 of an outer rotor type motor is described as an example. However, the present invention is not limited thereto. The present invention may be applied to a stator of an inner rotor type motor in which teeth extend from a core back radially inwardly. In a case where the third or fourth preferred embodiment is applied to the inner rotor type motor, the retainer a*d* may project radially inwardly so as to be bent and used for winding performed for preventing loosening of the winding wire.

Fifth Preferred Embodiment

Figure 14:
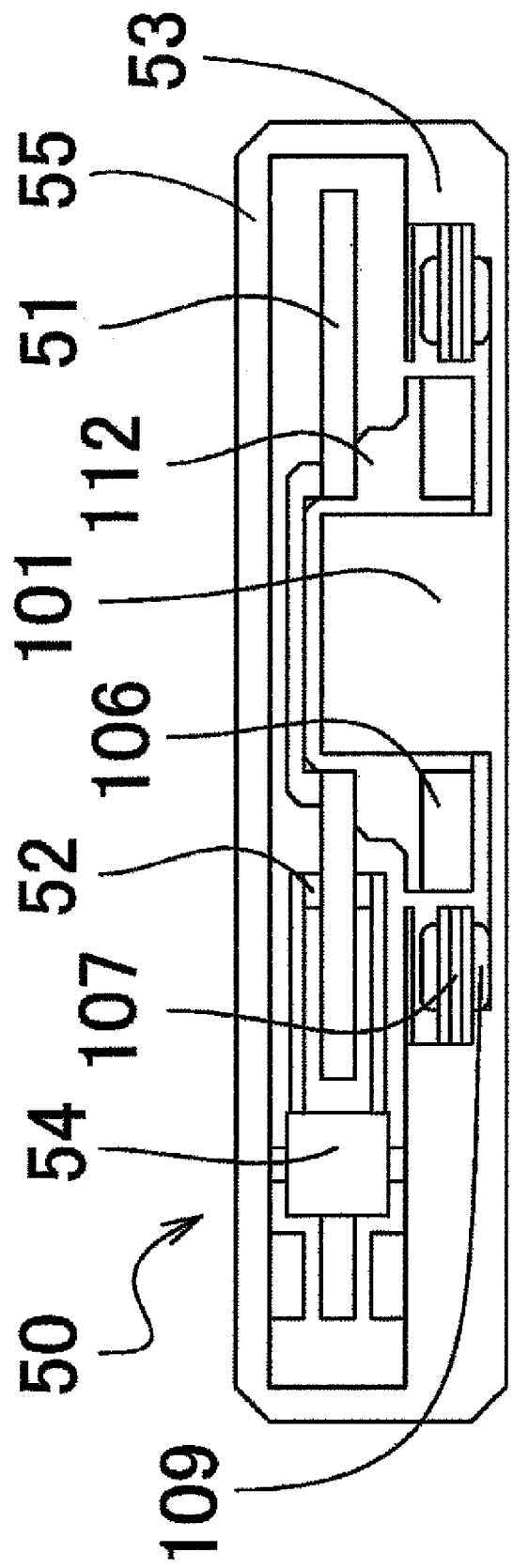
FIG. 14 is a cross-sectional view of a disk drive according to a fifth preferred embodiment of the present invention.

A disk drive according to a fifth preferred embodiment of the present invention is now described referring to FIG. 14. FIG. 14 is a cross-sectional view of the disk drive 50 of this preferred embodiment. The disk drive 50 is a hard disk drive, for example.

The disk drive 50 includes a disk-shaped storage medium (hereinafter, simply referred to as a disk) 51 capable of storing information therein, a spindle motor 101 which can rotate the disk 51, a head 52 which makes an access to the disk 51, and a case 55 accommodating the disk 51, the spindle motor 101, and the head 52 therein.

A motor stator 107 of the spindle motor 101 includes an inner rotor type stator core stack. The outer peripheral portion of the stator core stack is fixed to the base 53 which is formed integrally with the bracket of the spindle motor 101. The stator core stack includes a core back and a plurality of teeth extending from the core back radially inwardly. A rotor magnet 106 attached to a radially outer surface of a rotor hub 112 is opposed to the stator core stack in the radial direction. The motor stator 107 also includes a plurality of coil windings 109 formed by winding wires wound around the teeth. In this preferred embodiment, the winding wires are non-self-bonding type magnetic wires which do not include a bonding layer. Supply of power or signals to the coil windings 109 is controlled by a control circuit (not shown) provided outside the case 55.

The disk 51 is mounted on the rotor hub 112 of the spindle motor 101 and rotates together with the rotor hub 112. When power supply to the coil windings 109 of the motor stator 107 is turned on by the control circuit, the spindle motor 101 rotates. The spindle motor 101 is controlled by PWM control. That is, counterelectromotive power generated when a pulsed current input to the coil windings 109 is turned off can be used for driving the spindle motor 101. Therefore, it is possible to control the spindle motor 101 efficiently. Moreover, the motor stator 107 is adjusted to minimize mutual inductances between phases thereof. Therefore, it is possible to obtain the direction and speed of the rotation of the spindle motor 101 even when the rotation speed is small. Accordingly, the efficiency of the motor can be made higher in a wider range of rotation speed.

The motor stator 107 of this preferred embodiment uses non-self-bonding wires for forming the coil windings 109, and winding for loosening of the non-self-bonding wire is mechanically achieved. Therefore, gas is not generated and the atmosphere in the case 55 can be kept very clean. This is advantageous to at least one of writing information on and reading information from the disk 51 having high areal density.

The first to fifth preferred embodiments of the present invention are described above. However, the present invention is not limited thereto. The present invention can be modified in various ways without departing the scope of the present invention. For example, the phases, the tooth numbers, and the slot numbers can be changed.

While preferred embodiments of the present invention have been described above, it is to be understood that variations and modifications will be apparent to those skilled in the art without departing the scope and spirit of the present invention. The scope of the present invention, therefore, is to be determined solely by the following claims.

What is claimed is:

1. A motor stator comprising:
a stator core stack having an annular core back and 3s teeth extending from the stator core stack in a radial direction of the core back, where s is a positive integer;
a first phase winding wire wound around first s teeth of the 3s teeth;
a second phase winding wire wound around second s teeth of the 3s teeth; and
a third phase winding wire wound around third s teeth of the 3s teeth, wherein
the first phase winding wire, the second phase winding wire, and the third phase winding wire have no bonding layer, and
only the first phase winding wire and the third phase winding wire are wound to prevent loosening thereof.

2. A motor stator according to claim 1, wherein
each of the first phase winding wire, the second phase winding wire, and the third phase winding wire is wound around every third tooth N times, where N is an integer larger than 2, and
the first phase winding wire is wound n times in a clockwise direction around one of two teeth included in the teeth around which the second phase winding wire or the third phase winding wire is wound N times, and is wound n times in a counterclockwise direction around the other of the two teeth, where n is a positive integer smaller than 4.

3. A motor stator according to claim 2, wherein the first phase winding wire is wound around at least one tooth around which the third phase winding wire is wound N times, to prevent loosening of the first phase winding wire.

4. A motor stator according to claim 1, wherein
each of the first phase winding wire, the second phase winding wire, and the third phase winding wire is wound around every third tooth N times, where N is an integer larger than 2, and
the third phase winding wire is wound n times in a clockwise direction around one of two teeth included in the teeth around which the first phase winding wire or the second phase winding wire is wound N times, and is wound n times in a counterclockwise direction around the other of the two teeth, where n is a positive integer smaller than 4.

5. A motor stator according to claim 4, wherein the third phase winding wire is wound around at least one tooth around which the second phase winding wire is wound N times, to prevent loosening of the third phase winding wire.

6. A motor stator according to claim 1, wherein
each of the first phase winding wire, the second phase winding wire, and the third phase winding wire is wound around every third tooth N times, where N is an integer larger than 2, and
winding for preventing loosening of the first phase winding wire is performed twice on one of the teeth around which the second phase winding wire or the third phase winding wire is wound N times, and
the first phase winding wire is wound in a clockwise direction n times in one of the first and second winding for preventing loosening thereof and is wound n times in a counterclockwise direction, where n is a positive integer smaller than 4.

7. A motor stator according to claim 6, wherein
winding for preventing loosening of the first phase winding wire is performed on the teeth around which the third phase winding wire is wound N times.

8. A motor stator according to claim 2, wherein
each of the first phase winding wire, the second phase winding wire, and the third phase winding wire is wound around every third tooth N times, where N is an integer larger than 2, and
winding for preventing loosening of the third phase winding wire is performed twice on one of the teeth around which the first phase winding wire or the second phase winding wire is wound N times, and
the third phase winding wire is wound in a clockwise direction n times in one of the first and second winding for preventing loosening thereof and is wound n times in a counterclockwise direction, where n is a positive integer smaller than 4.

9. A motor stator according to claim 8, wherein
winding for preventing loosening of the third phase winding wire is performed on the teeth around which the second phase winding wire is wound N times.

10. A motor stator according to claim 1, wherein
the stator core stack includes a plurality of metal thin plates which are laminated, at least one of the metal thin plates having a retainer between the teeth, the retainer extending from the core back in the radial direction of the core back and being bent approximately at a right angle with respect to the metal thin plates to project from an end of the stator core stack in a laminating direction of the metal thin plates, and
at least one of the first winding wire and the third winding wire is wound around the retainer to prevent loosening thereof.

11. A motor stator according to claim 1, wherein end portions of the first phase winding wire, the second phase winding wire, and the third phase winding wire are pulled out from a same one of slots formed between the teeth.

12. A spindle motor comprising:
the motor stator according to claim 1;
a bracket to which the motor stator is fixed; and
a rotor opposed to the motor stator with a gap in the radial direction of the core back of the motor stator, wherein signals supplied to the first phase winding wire, the second phase winding wire, and the third phase winding wire are controlled by PWM control.

13. A disk drive for use with a disk-shaped storage medium capable of storing information, comprising:

the spindle motor according to claim 12 operable to rotate the disk-shaped storage medium;

a head operable to carry out at least one of reading information from and writing information on the disk-shaped storage medium; and a case operable to accommodate the disk-shaped storage medium, the spindle motor, and the head therein.

* * * * *